United States Patent
Takewari

(10) Patent No.: US 12,479,453 B2
(45) Date of Patent: Nov. 25, 2025

(54) CONTROL DEVICE FOR DETECTING VEHICLE REAR ATTACHMENT AND TURNING OFF REAR OBJECT DETECTION SENSOR

(71) Applicant: Honda Motor Co., Ltd., Tokyo (JP)

(72) Inventor: Yumenosuke Takewari, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 72 days.

(21) Appl. No.: 18/186,953

(22) Filed: Mar. 21, 2023

(65) Prior Publication Data

US 2024/0317251 A1  Sep. 26, 2024

(51) Int. Cl.
*B60W 50/14* (2020.01)
*B60R 11/04* (2006.01)
*G06V 20/56* (2022.01)

(52) U.S. Cl.
CPC ............. *B60W 50/14* (2013.01); *B60R 11/04* (2013.01); *G06V 20/56* (2022.01); *B60R 2300/8093* (2013.01); *B60W 2050/143* (2013.01); *B60W 2050/146* (2013.01); *B60W 2520/10* (2013.01)

(58) Field of Classification Search
CPC .......... B60W 50/14; B60W 2050/143; B60W 2050/146; B60W 2520/10; B60R 11/04; B60R 2300/8093; G06V 20/56
See application file for complete search history.

(56) References Cited

U.S. PATENT DOCUMENTS

| | | | | |
|---|---|---|---|---|
| 2007/0103280 A1* | 5/2007 | Kanafani | ............... | B60D 1/248 340/440 |
| 2008/0024283 A1* | 1/2008 | Kim | ...................... | B60Q 9/006 340/431 |
| 2015/0344010 A1* | 12/2015 | Kurtovic | ................ | B60T 8/171 701/70 |
| 2017/0334413 A1* | 11/2017 | Murakoshi | ................ | B60T 7/22 |
| 2019/0225154 A1* | 7/2019 | Ionascu | ................ | G06F 18/256 |
| 2021/0287548 A1* | 9/2021 | Lai | .......................... | B60R 1/025 |

FOREIGN PATENT DOCUMENTS

| | | | | |
|---|---|---|---|---|
| GB | 2503269 A | * | 12/2013 | ............... B60S 1/04 |
| JP | 4049012 B2 | * | 2/2008 | |
| JP | 2017047807 | | 3/2017 | |

* cited by examiner

Primary Examiner — Rufus C Point
(74) Attorney, Agent, or Firm — JCIPRNET

(57) ABSTRACT

A control device adapted for a vehicle is provided. The control device includes a processor configured to function as an object detection part detecting an object at a rear of the vehicle, an alarm part providing an alarm in a case that the object detection part detects that the vehicle has a probability of colliding with the object at the rear of the vehicle, and a determination part determining whether the vehicle is in a tow state or a non-tow state, wherein in a case when the object detection part detects that the object is located within a predetermined distance of the vehicle for greater than or equal to a predetermined amount of time while the vehicle is being driven, the determination part determines the vehicle is in a tow state and provides a suggestion to not provide the alarm.

12 Claims, 6 Drawing Sheets

CONTROL DEVICE FOR DETECTING VEHICLE REAR ATTACHMENT AND TURNING OFF REAR OBJECT DETECTION SENSOR

BACKGROUND

Technical Field

The disclosure relates to a control device of a vehicle, and more specifically relates to the control device of the vehicle for detecting a vehicle rear attachment and then turning off a rear object detection sensor of the vehicle when the vehicle rear attachment is detected.

Description of Related Art

Conventionally, when a vehicle rear attachment (for example a cycle carrier) is attached to the rear of a vehicle, a rear object detection sensor of the vehicle may not be used since the rear object detection sensor may continuously detect an object (for example, detect the cycle carrier it self or a bicycle that is mounted to the cycle carrier) that is present at the rear of the vehicle. Therefore, an additional sensor may be disposed on the vehicle rear attachment to act as the rear object detection sensor.

However, there may be an increase in cost associated with providing the additional sensor. In order to provide a low cost configuration, a way for a user to intuitively turn OFF the rear object detection sensor is needed.

SUMMARY

According to an embodiment of the disclosure, a control device adapted for a vehicle is provided. The control device includes a processor configured to function as an object detection part detecting an object at a rear of the vehicle, an alarm part providing an alarm in a case that the object detection part detects that the vehicle has a probability of colliding with the object at the rear of the vehicle, and a determination part determining whether the vehicle is in a tow state or a non-tow state, wherein in a case when the object detection part detects that the object is located within a predetermined distance of the vehicle for greater than or equal to a predetermined amount of time while the vehicle is being driven, the determination part determines the vehicle is in a tow state and provides a suggestion to not provide the alarm.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

Figure 1:
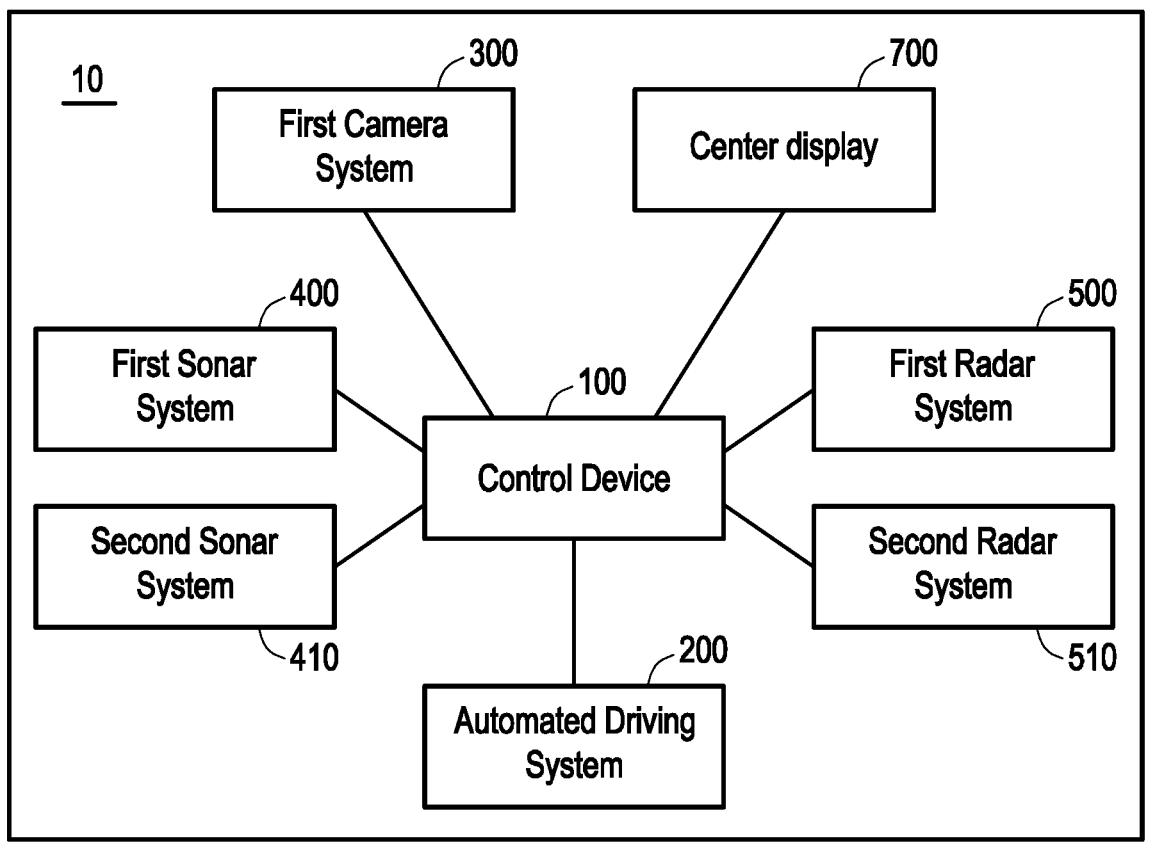
FIG. 1 is a schematic diagram illustrating a control device according to an embodiment of the disclosure.

FIG. 1 is a schematic diagram illustrating a control device according to an embodiment of the disclosure. Referring to FIG. 1, a vehicle 10 is provided. The vehicle 10 includes a control device 100 for a vehicle 10. The control device 100 includes a processor and a memory. The vehicle 10 may include an automated driving system 200 for automated driving of the vehicle 10. The automated driving system 200 is coupled to the control device 100, wherein the control device 100 transmits control signals to the automated driving system 200 so that the automated driving system 200 may perform automated driving of the vehicle 10. In more detail, the automated driving system 200 may include, for example, motors, sensors, actuators, processors and/or the like for performing automatic driving, automatic steering and automatic braking of the vehicle 10 without a user manually stepping on a gas pedal, steering and braking the vehicle 10. In addition, the vehicle 10 may be driven manually by the user instead of by the automated driving system 200, or semi-automatedly by the user and the automated driving system 200 together.

Referring to FIG. 1, the vehicle 10 includes a plurality of sensors. More specifically, the vehicle 10 includes a first camera system 300, a first sonar system 400, a second sonar system 410, a first radar system 500, a second radar system 510 for detecting an object around the vehicle 10. A number of the plurality of sensors is not intended to limit the disclosure and may be set according to requirements. An object(s) on a left side, a right side, a front side, a rear side of the vehicle 10 may be detected based on a configuration of the first camera system 300, the first sonar system 400, the second sonar system 410, the first radar system 500 and the second radar system 510.

The control device 100 includes a data receiving part, receiving sensor data from the first camera system 300, the first sonar system 400, the second sonar system 410, the first radar system 500 and the second radar system 510. Each of the first camera system 300, the first sonar system 400, the second sonar system 410, the first radar system 500 and the second radar system 510 may be an example of a rear object detection sensor.

The first camera system 300 may include, for example, a camera and/or an image sensor. The first camera system 300 may detect an object in a line of sight (field of view) of the first camera system 300. In addition, the first camera system 300 may detect if an object is located in a viewing area of the first camera system 300. The first camera system 300 is an example of a rear object detection sensor. A number of the camera systems is not intended to limit the disclosure and may be set according to requirements. The first camera system 300 may be disposed at, for example, a rear of the vehicle 10.

The first sonar system 400 and the second sonar system 410 may each include, for example, a sonar and/or a sonar microphone. The first sonar system 400 and the second sonar system 410 may detect, for example, a distance to an object and detect a signal level of a reflected wave from the object. The first sonar system 400 and the second sonar system 410 are each an example of a rear object detection sensor. A number of the sonar systems is not intended to limit the disclosure and may be set according to requirements.

The first radar system 500 and the second radar system 510 may each include, for example, an array radar, an antenna and/or a phased array antenna. The first radar system 500 and the second radar system 510 may detect, for example, a distance to the object and detect a height of the object from a road surface. The first radar system 500 and the second radar system 510 are each an example of a rear object detection sensor. A number of the radar systems is not intended to limit the disclosure and may be set according to requirements.

Figure 2:
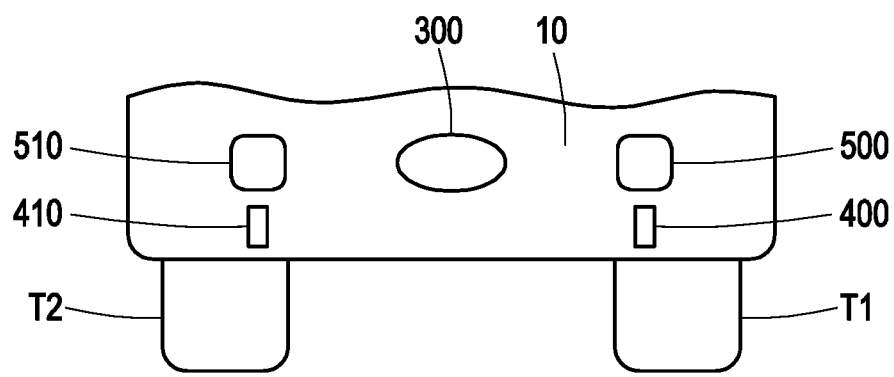
FIG. 2 is a schematic diagram illustrating a rear view of a vehicle according to an embodiment of the disclosure.

FIG. 2 is a schematic diagram illustrating a rear view of a vehicle according to an embodiment of the disclosure. Referring to FIG. 2, the vehicle 10 may include a first tire T1 and a second tire T2. A number of the tires is not intended to limit the disclosure and may be set according to requirements. The first camera system 300, the first sonar system 400, the second sonar system 410, the first radar system 500 and the second radar system 510 are disposed on a rear of the vehicle 10. More specifically, the first camera system 300, the first sonar system 400, the second sonar system 410, the first radar system 500 and the second radar system 510 are disposed at a rear bumper of the vehicle 10 to detect an object that is at the rear of the vehicle 10. However, the disclosure is not limited thereto. In another embodiment of the disclosure, for example, the first sonar system 400, the second sonar system 410, the first radar system 500 and the second radar system 510 may be disposed at a front of the vehicle 10 and/or a side of the vehicle 10. More specifically, the first sonar system 400, the second sonar system 410, the first radar system 500 and the second radar system 510 may be disposed at a front bumper or a side of the vehicle 10 to detect the object that is at the front or the side of the vehicle 10. The plurality of sensors may be disposed at locations of the vehicle 10 according to requirements.

Figure 3:
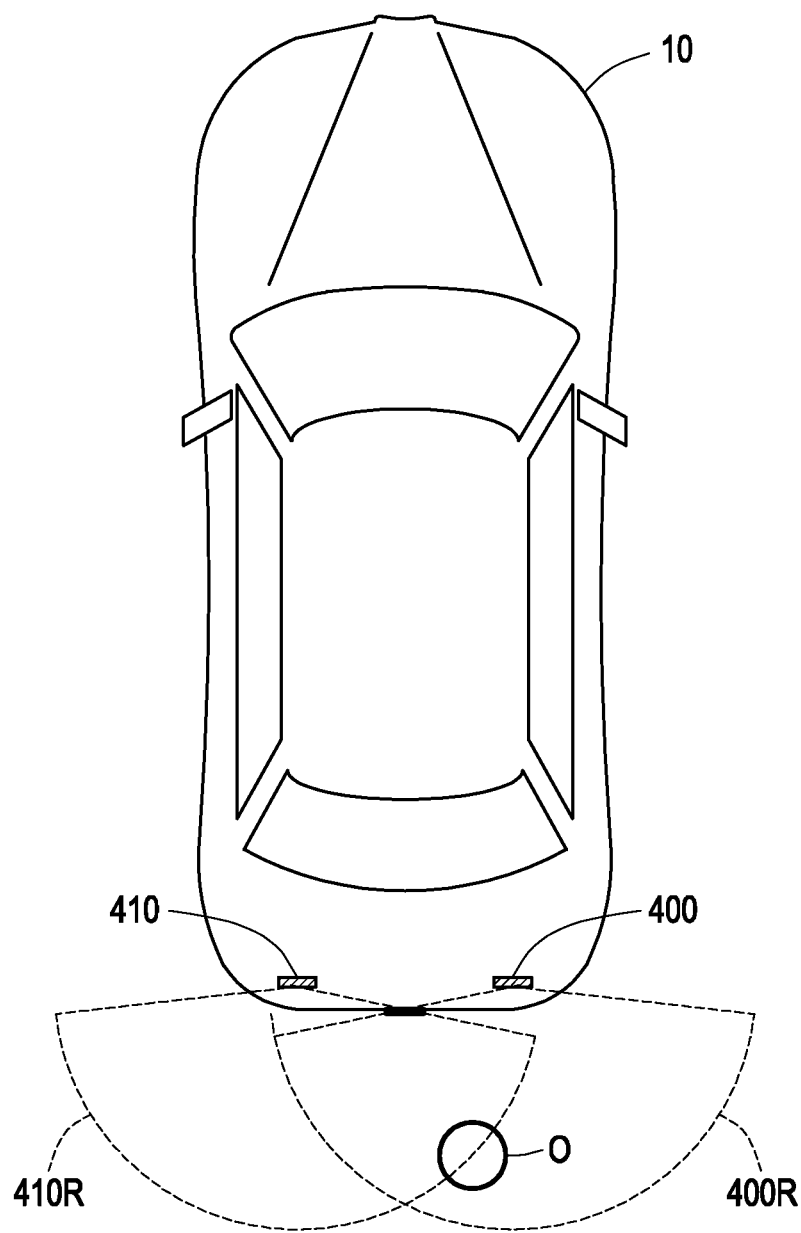
FIG. 3 is a schematic diagram illustrating a vehicle including a first rear object detection sensor and a second rear object detection sensor for detecting an object around the vehicle according to an embodiment of the disclosure.

FIG. 3 is a schematic diagram illustrating a vehicle including a first rear object detection sensor and a second rear object detection sensor for detecting an object around the vehicle according to an embodiment of the disclosure. Referring to FIG. 3, the first sonar system 400 is an example of the first rear object detection sensor, and the second sonar system 410 is an example of the second rear object detection sensor. The first sonar system 400 has a first sonar detection range 400R, and the second sonar system 410 has a second sonar detection range 410R. The first sonar system 400 may detect an object O located inside the first sonar detection range 400R. The second sonar system 410 may detect the object O located inside the second sonar detection range 410R. The first sonar detection range 400R may be different from the second sonar detection range 410R. The first sonar detection range 400R may overlap with the second sonar detection range 410R. In the present embodiment, the object O may be, for example, another vehicle, a wall, a power pole, and/or the like. However, the disclosure is not limited thereto. The rear object detection sensors are coupled to the control device 100, wherein the control device 100 includes an object detection part detecting the object O at the rear of the vehicle 10 based on the sensor data received from the rear object detection sensors. In addition, the control device 100 includes an alarm part providing an alarm in a case that the object detection part detects that the vehicle 10 has a probability of colliding with the object O at the rear of the vehicle 10. The object detection part may determine that the vehicle 10 has a probability of colliding with the object O at the rear of the vehicle 10, for example, when the first sonar system 400 detects the object O inside the first sonar detection range 400R and/or the second sonar system 410 detects the object O inside the second sonar detection range 410R.

The alarm may be, for example, a sound alarm such as a beeping sound. The sound alarm may be generated by, for example, a buzzer, a speaker and/or the like. The buzzer/speaker may be coupled to the control device 100. The sound alarm may be continuous and/or intermittent according to requirements. For example, when the probability of the vehicle 10 colliding with the object O becomes higher, a frequency of the intermittent beep may increase. When a distance between the vehicle 10 and the object O becomes lesser than a predetermined distance, the beep may be continuous and not intermittent. For example, when the distance between the vehicle 10 and the object O becomes greater than the predetermined distance, the beeping may be intermittent and not continuous. The alarm part is configured to provide the alarm to alert a driver to the presence of the object O that is located at the rear of the vehicle 10. The alarm part may be configured to provide the alarm when a drive state of the vehicle 10 is in reverse gear, and not provide the alarm when the drive state of the vehicle is in drive gear. In other words, the driver is alerted to the presence of the object O that is located at the rear of the vehicle 10 when the vehicle moves in reverse (backward), and the driver is not alerted to the presence of the object O that is located at the rear of the vehicle 10 when the vehicle moves forward. In another embodiment of the disclosure, the alarm may be, for example, a visual alert (notification) displayed on a screen such as a windshield, a dashboard, a center display of the vehicle and/or the like. The above described alarms are examples only and the disclosure is not limited thereto.

Referring to FIG. 3, the first camera system 300, the first radar system 500 and the second radar system 510 shown in FIG. 1 and FIG. 2 are not illustrated in FIG. 3 merely to simplify the explanation. It may be understood that the first camera system 300, the first radar system 500 and the second radar system 510 may be included or not included in the vehicle 10 according to requirements. That is to say, a number of the rear object detection sensors is not intended to limit the disclosure, and may be set according to requirements.

Figure 4:
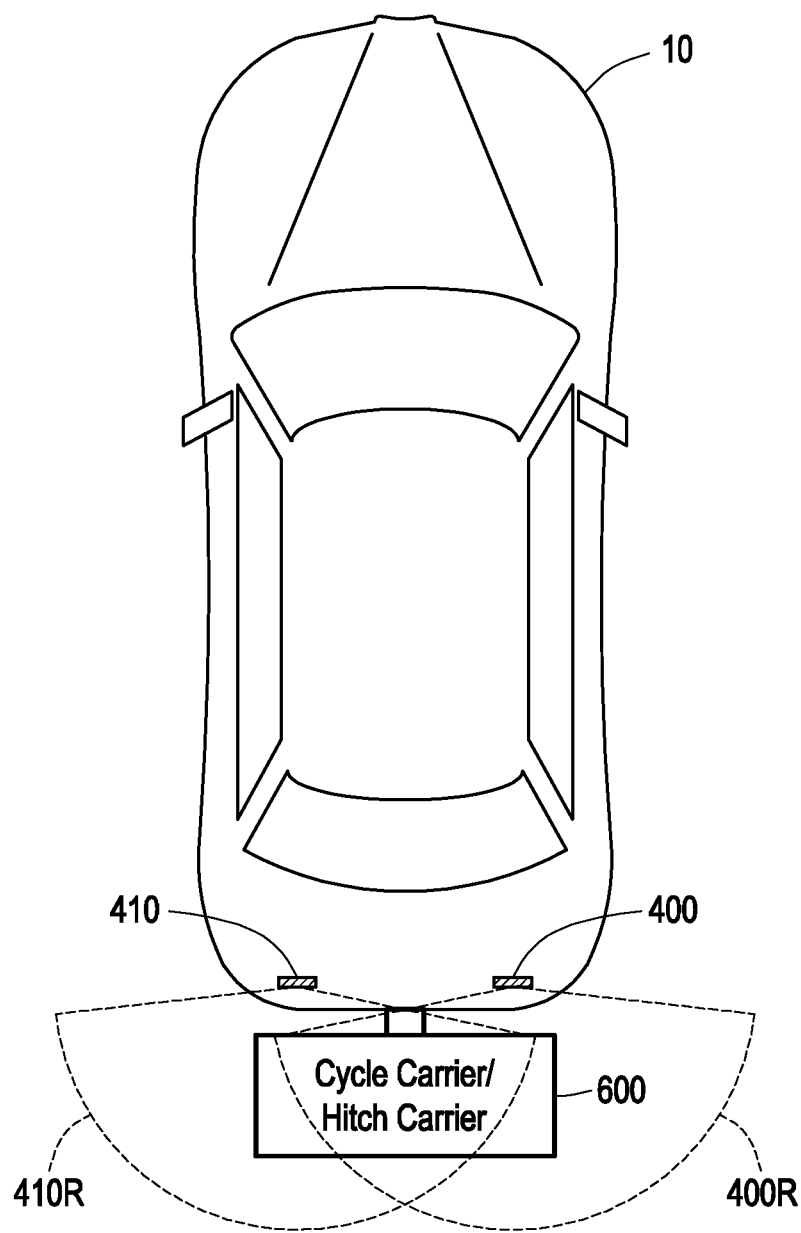
FIG. 4 is a schematic diagram illustrating a vehicle including a vehicle rear attachment according to an embodiment of the disclosure.

FIG. 4 is a schematic diagram illustrating a vehicle including a vehicle rear attachment according to an embodiment of the disclosure. Referring to FIG. 4, the vehicle 10 includes a vehicle rear attachment 600. The vehicle rear attachment 600 may be, for example, cycle carrier, a hitch carrier, a trailer, a bicycle and/or the like. However, the disclosure is not limited thereto. The vehicle rear attachment 600 may be an attachment that is attached to the rear of the vehicle 10.

Referring to FIG. 4, when the vehicle rear attachment 600 is attached to the vehicle 10, the first sonar system 400 may detect the vehicle rear attachment 600 as an object O located inside the first sonar detection range 400R. In addition, the second sonar system 410 may detect the vehicle rear attachment 600 as an object O located inside the second sonar detection range 410R. When the vehicle 10 includes the vehicle rear attachment 600, there may be a case that the first sonar system 400 and/or the second sonar system 410 of the vehicle 10 may not be able to be used since the first sonar system 400 and/or the second sonar system 410 continuously detects the object O (the vehicle rear attachment 600) behind the vehicle 10. That is to say, the alarm part may be continuously providing the alarm since the object detection part erroneously detects that the vehicle 10 has a probability of colliding with the vehicle rear attachment 600 at the rear of the vehicle 10, since the object detection part is detecting the vehicle rear attachment 600 as the object O. However, the vehicle 10 has no probability of colliding with the vehicle rear attachment 600 since the vehicle rear attachment 600 is attached to the vehicle 10, and the vehicle rear attachment 600 moves with the vehicle 10.

Therefore, in the present embodiment, the control device 100 is configured to determine the vehicle 10 is in a tow state and provides a suggestion to not provide the alarm. That is to say, the control device 100 includes the determination part configured to determine whether the vehicle 10 is in the tow state or in a non-tow state. The tow state may be, for example, when the vehicle rear attachment 600 is attached to the vehicle 10. The non-tow state may be, for example, when the vehicle rear attachment 600 is not attached to the vehicle 10.

Referring to FIG. 4, the control device 100 may determine the vehicle 10 is in the tow state or in the non-tow state in the following way. In a case when the object detection part of the control device 100 detects that the object O is located within a predetermined distance D of the vehicle 10 for greater than or equal to a predetermined amount of time T while the vehicle 10 is being driven (while the vehicle is being driven, for example, when the ignition of the vehicle 10 is ON, when the gear of the vehicle is in Drive, when the gear of the vehicle is in Reverse, when the vehicle 10 is moving/travelling forward/rearward), the determination part of the control device 100 determines the vehicle 10 is in the tow state and provides a suggestion to not provide the alarm. In an embodiment of the disclosure, the control device 100 may determine the vehicle 10 is in the tow state or in the non-tow state while the gear of the vehicle is Drive, and not in Reverse, Park or Neutral. In another embodiment of the disclosure, the control device 100 may determine the vehicle 10 is in the tow state or in the non-tow state while the gear of the vehicle is not in Drive, and is in Reverse, Park or Neutral. The suggestion to not provide the alarm may be a visual display that is displayed on the center display of the vehicle 10. The predetermined distance D may be, for example, 2 meters, 1 meter, 0.5 meters, 0.3 meters and/or the like. The predetermined amount of time T may be, for example, 10 minutes, 5 minutes, 1 minute, 30 seconds, 10 seconds, 5 seconds and/or the like. The predetermined distance D and the predetermined amount of time T are provided as examples only and the disclosure is not limited thereto.

Referring to FIG. 4, in a case when the vehicle 10 is being driven at a speed greater than or equal to a first predetermined speed, and the object detection part of the control device 100 detects that the object O is located within the predetermined distance D of the vehicle 10 for greater than the predetermined amount of time T, the determination part determines the vehicle 10 is in the tow state. The first predetermined speed may be, for example, 20 kilometers an hour. In this way, since when the vehicle 10 is travelling at low speeds (for example, less than 20 km/h), a following distance of another vehicle that is behind the vehicle 10 may be short (for example, less than 2 meters), therefore the possibility of erroneously recognizing the another vehicle that is behind the vehicle 10 as the vehicle rear attachment 600 may be reduced by setting the first predetermined speed. When the vehicle 10 is travelling at 20 km/h or more, the following distance of the another vehicle behind the vehicle 10 is generally 2 meters or more, so the another vehicle cannot be detected by the sonar of the vehicle 10. In this way, the possibility of the vehicle 10 erroneously recognizing the another vehicle behind the vehicle 10 as a towed object can be further reduced.

Referring to FIG. 4, in a case when the vehicle 10 is being driven at a speed lesser than or equal to a second predetermined speed, and the object detection part of the control device 100 detects that the object O is located within the predetermined distance D of the vehicle 10 for greater than the predetermined amount of time T, the determination part determines the vehicle 10 is in the tow state. The second predetermined speed may be, for example, 30 kilometers an hour. In this way, when detecting objects O with a sonar sensor (sound wave) such as the first sonar system 400 and/or the second sonar system 410, the sonar sensor is affected by the wind, so if the vehicle speed increases, there is the possibility the wind may become noise. Therefore, by detecting the tow state of the vehicle 10 in a vehicle speed range where the wind may become noise is less likely to occur, then the towed object can be more accurately detected.

Referring to FIG. 4, the control device 100 may determine the vehicle 10 is in the tow state or not in the tow state while the vehicle is travelling within a predetermined speed range. The predetermined speed range may be, for example, while the vehicle 10 is being driven at a speed greater than or equal to the first predetermined speed, and the vehicle 10 is being driven at a speed lesser than or equal to the second predetermined speed.

Figure 5:
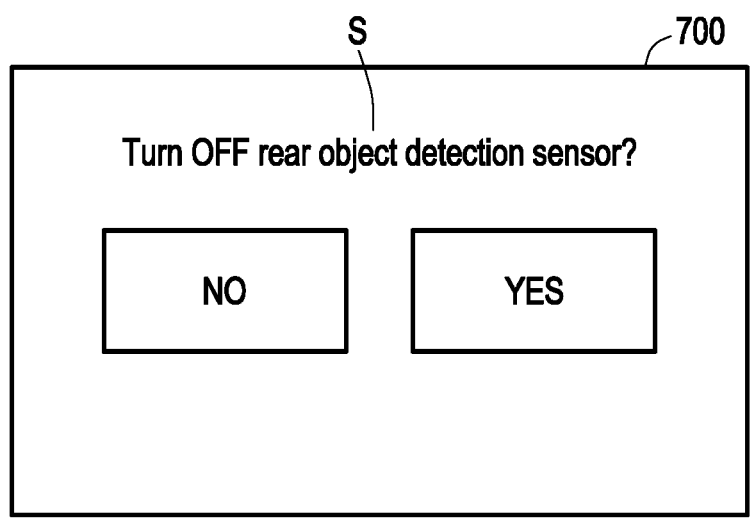
FIG. 5 is a schematic diagram illustrating a suggestion to not provide the alarm that is displayed on a center display of the vehicle according to an embodiment of the disclosure.

FIG. 5 is a schematic diagram illustrating a suggestion to not provide the alarm that is displayed on a center display of the vehicle according to an embodiment of the disclosure. Referring to FIG. 5, a center display 700 may be, for example, a touch screen wherein a user may enter input. A suggestion S to not provide the alarm is displayed on the center display 700. More specifically, the suggestion S to not provide the alarm may be, automatically displayed on the center display 700 when the control device 100 determines the vehicle 10 is in the tow state. The suggestion S to not provide the alarm may inquire, for example, "Turn OFF rear object detection sensor?". The control device 100 includes an input part configured to receive an input to the suggestion to not provide the alarm. More specifically, the control device 100 is configured to receive the user input (instruction) to turn OFF rear object detection sensor, or to not turn OFF rear object detection sensor. For example, the user may input "YES" to not provide the alarm even when the rear object detection sensor (the rear object detection sensor, for example, the first camera system 300, the first sonar system 400, the second sonar system 410, the first radar system 500 and the second radar system 510) detects the object O. In addition, the user may input "NO" to provide the alarm when the rear object detection sensor detects the object O. In this way, the user may intuitively turn OFF the rear object detection sensor as needed.

Referring to FIG. 5, the suggestion S to not provide the alarm may be displayed on the center display 700 at any time once the control device 100 determines the vehicle 10 is in the tow state. In an embodiment of the disclosure, the suggestion S to not provide the alarm may be displayed on the center display 700 when the vehicle 10 is being driven (while the vehicle is being driven, for example, when the ignition of the vehicle 10 is ON, when the gear of the vehicle is in Drive, when the gear of the vehicle is in Reverse, when the gear of the vehicle is in Park, when the gear of the vehicle is in Neutral, when the vehicle 10 is moving/travelling forward/rearward). In this way, the user may intuitively turn OFF the rear object detection sensor as needed.

In another embodiment of the disclosure, the suggestion S to not provide the alarm may be displayed on the center display 700 after the drive state of the vehicle is changed to reverse. That is to say, when the determination part of the control device 100 determines the vehicle 10 is in the tow state, the determination part is configured to provide the suggestion S to not provide the alarm when the drive state of the vehicle 10 is changed to reverse. In other words, the suggestion S to not provide the alarm is not displayed on the center display 700 before the drive state of the vehicle 10 is changed to reverse. In this way, the user may intuitively turn OFF the rear object detection sensor as needed.

Referring to FIG. 5, in the case that the user fails to select "YES" or "NO" in response to the suggestion S to not provide the alarm that is displayed on the center display 700, when the drive state of the vehicle 10 is changed to reverse and the vehicle 10 moves in reverse, the alarm part is configured to provide the alarm. In this way, in a case when the user fails to notice the suggestion S displayed on the center display 700 and proceeds to drive the vehicle 10 in reverse (rearward), the alarm is provided wherein the user may then notice the suggestion S displayed on the center display 700 and select "YES" or "NO" to turn off the alarm or not. When "YES" is selected, then the alarm is not provided even when the object O is detected by the first sonar system 400, and/or the second sonar system 410. When "NO" is selected, then the alarm is provided when the object O is detected by the first sonar system 400, and/or the second sonar system 410.

Figure 6A:
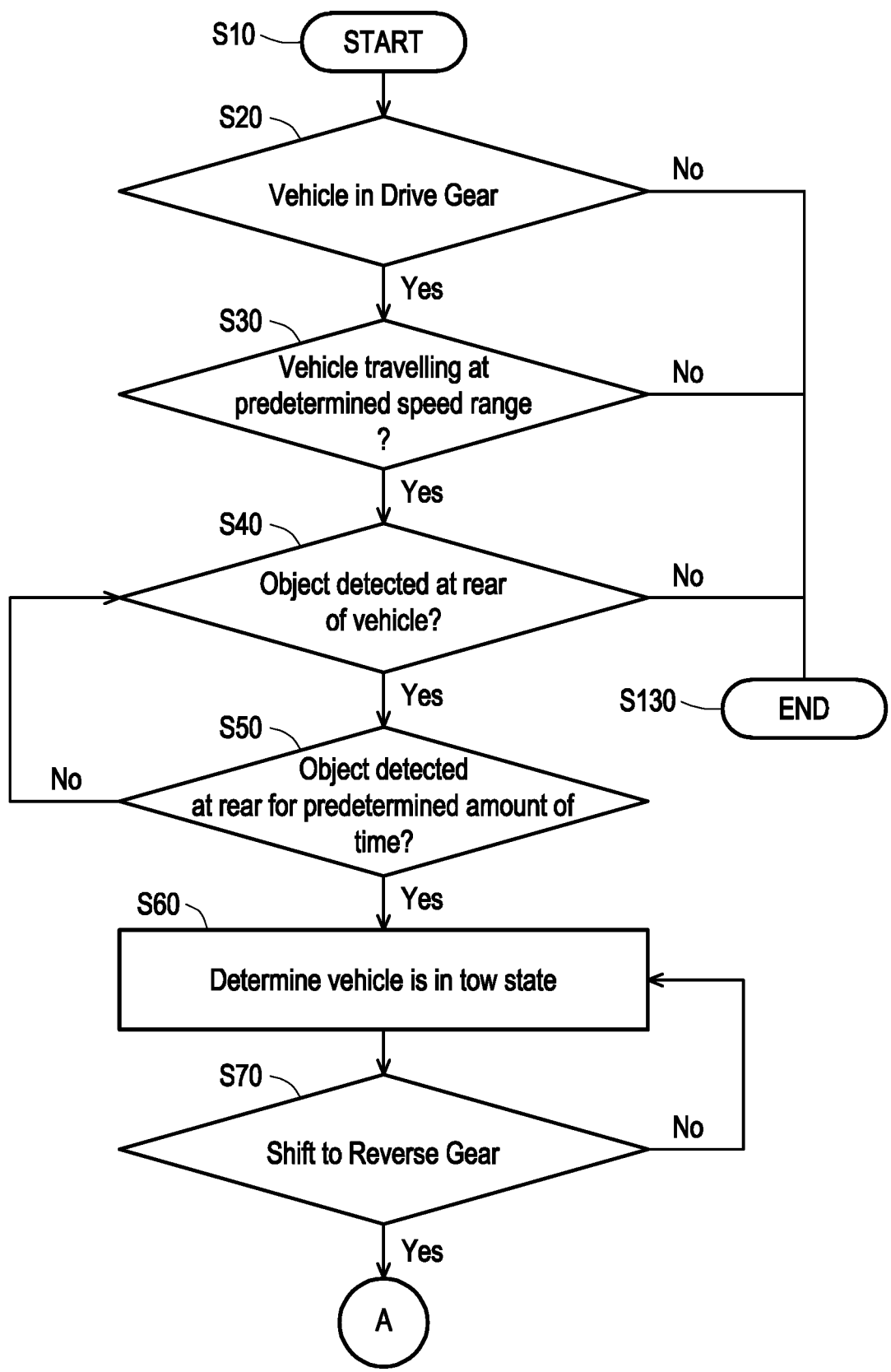
FIGS. 6A and 6B is a schematic flow chart illustrating a flow of turning OFF a rear object detection sensor according to an embodiment of the disclosure.
Figure 6B:
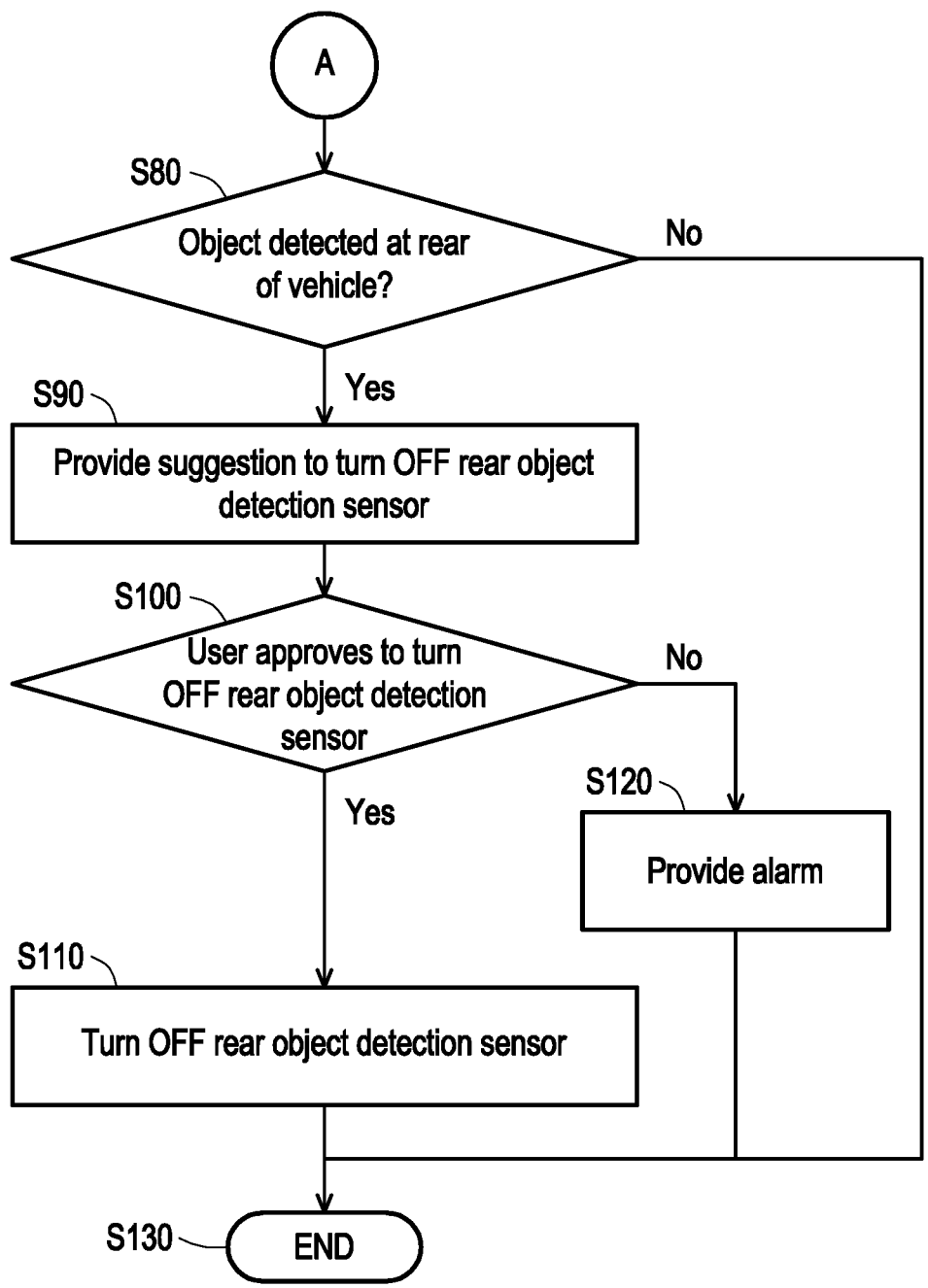

FIGS. 6A and 6B is a schematic flow chart illustrating a flow of turning OFF a rear object detection sensor according to an embodiment of the disclosure. In an embodiment of the disclosure, step S10 through step S60 may be performed one time only for every one time the ignition is turned on or for every one time the gear is shifted to Drive. In another embodiment of the disclosure, step S10 to step S60 may be performed a plurality of times for every one time the ignition is turned on or for every one time the gear is shifted to Drive. The number of times the control device 100 attempts to determine whether the vehicle 10 is in the tow state is not intended to limit the disclosure. In addition, in an embodiment of the disclosure, at any time the control device 100 determines the vehicle 10 is in the tow state, and the control device does not detect the vehicle rear attachment 600 (or the object O), the control device 100 may automatically determine the vehicle 10 is in the non-tow state wherein the alarm will be provided at any time the object O is detected by the control device 100.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control device, adapted for a vehicle having a rear object detection sensor, the control device comprising:
   a hardware processor configured to:
   receive sensor data from the rear object detection sensor;
   detect an object at a rear of the vehicle based on the sensor data;
   provide an alarm in a case that the hardware processor detects that the vehicle has a probability of colliding with the object at the rear of the vehicle;
   determine whether the vehicle is in a tow state or a non-tow state;
   wherein in a case when the hardware processor detects that the object is located within a predetermined distance of the vehicle for greater than or equal to a predetermined amount of time while the vehicle is being driven, the hardware processor determines the vehicle is in the tow state and provides a suggestion to not provide the alarm,
   wherein the tow state is a state in which an attachment is attached to the rear of the vehicle, and the non-tow state is a state in which the attachment is not attached to the vehicle,
   wherein the suggestion to not provide the alarm is displayed on a center display of the vehicle,
   wherein the suggestion to not provide the alarm is provided on the center display of the vehicle when the vehicle is travelling forward.

2. The control device according to claim 1, wherein when the hardware processor determines the vehicle is in the tow state, the hardware processor is configured to provide the suggestion to not provide the alarm when a drive state of the vehicle is changed to reverse.

3. The control device according to claim 2, wherein in a case when the drive state of the vehicle is changed to reverse and the vehicle moves in reverse, the hardware processor provides the alarm.

4. The control device according to claim 1, wherein in a case when the vehicle is being driven at a speed greater than or equal to a first predetermined speed, and the hardware processor detects that the object is located within the predetermined distance of the vehicle for greater than the predetermined amount of time, the hardware processor determines the vehicle is in the tow state.

5. The control device according to claim 1, wherein in a case when the vehicle is being driven at a speed lesser than or equal to a second predetermined speed, and the hardware processor detects that the object is located within the predetermined distance of the vehicle for greater than the predetermined amount of time, the hardware processor determines the vehicle is in the tow state.

6. The control device according to claim 4, wherein in a case when the vehicle is being driven at a speed lesser than or equal to a second predetermined speed, and the hardware processor detects that the object is located within the predetermined distance of the vehicle for greater than the predetermined amount of time, the hardware processor determines the vehicle is in the tow state.

7. The control device according to claim 4, wherein the first predetermined speed is 20 kilometers an hour.

8. The control device according to claim 5, wherein the second predetermined speed is 30 kilometers an hour.

9. The control device according to claim 1, wherein the alarm is an emitted sound.

10. The control device according to claim 1, wherein the hardware processor is configured to receive an input to the suggestion to not provide the alarm.

11. The control device according to claim 10, wherein when the hardware processor receives the input to not provide the alarm, the hardware processor is configured to not provide the alarm even when the hardware processor detects the object.

12. A vehicle, comprising:
   the control device according to claim 1.

* * * * *